United States Patent [19]

Boisdon

[11] Patent Number: 4,691,325

[45] Date of Patent: Sep. 1, 1987

[54] CONTROL APPARATUS FOR A DIRECT CURRENT ARC FURNACE

[75] Inventor: Claude Boisdon, Avon, France

[73] Assignee: Jeumont-Schneider Corporation, Puteaux cedex, France

[21] Appl. No.: 831,658

[22] Filed: Feb. 20, 1986

[30] Foreign Application Priority Data

Feb. 21, 1985 [FR] France .................. 85 02482

[51] Int. Cl.⁴ .......................... H05B 7/148
[52] U.S. Cl. .................................. 373/108
[58] Field of Search ............... 373/108, 104, 105, 102

[56] References Cited

U.S. PATENT DOCUMENTS

| | | | |
|---|---|---|---|
| 2,632,862 | 3/1953 | Stoltz | 314/73 |
| 3,432,604 | 3/1969 | Harbaugh | 13/13 |
| 3,968,422 | 7/1976 | Waldmann | 323/102 |
| 4,320,245 | 3/1982 | Gaydon et al. | 13/12 |
| 4,607,373 | 8/1986 | Bergman | 373/108 X |

Primary Examiner—Roy N. Envall, Jr.
Attorney, Agent, or Firm—Rines and Rines, Shapiro and Shapiro

[57] ABSTRACT

The invention concerns a control apparatus for an arc furnace (1) comprising at least one electrode (2), and powered with direct current from an alternating current electric power source (4), through the intermediary of a controlled-rectifier converter (3).

According to the invention, this apparatus includes a loop (24) for rapid control of the reactive energy drawn from the alternating current power source (4), and a circuit (15) for limitation of the maximum intensity of the direct current flowing in the electrode (2). Preferably, the rapid control of the reactive energy is obtained by holding essentially constant the product of the intensity in the source (4) and the sine of the dephasing angle. It includes in addition a loop (13) for slow control generating a reference signal of the reactive energy applied to the said rapid control loop (24), and limiting the variation of the reactive energy.

10 Claims, 1 Drawing Figure

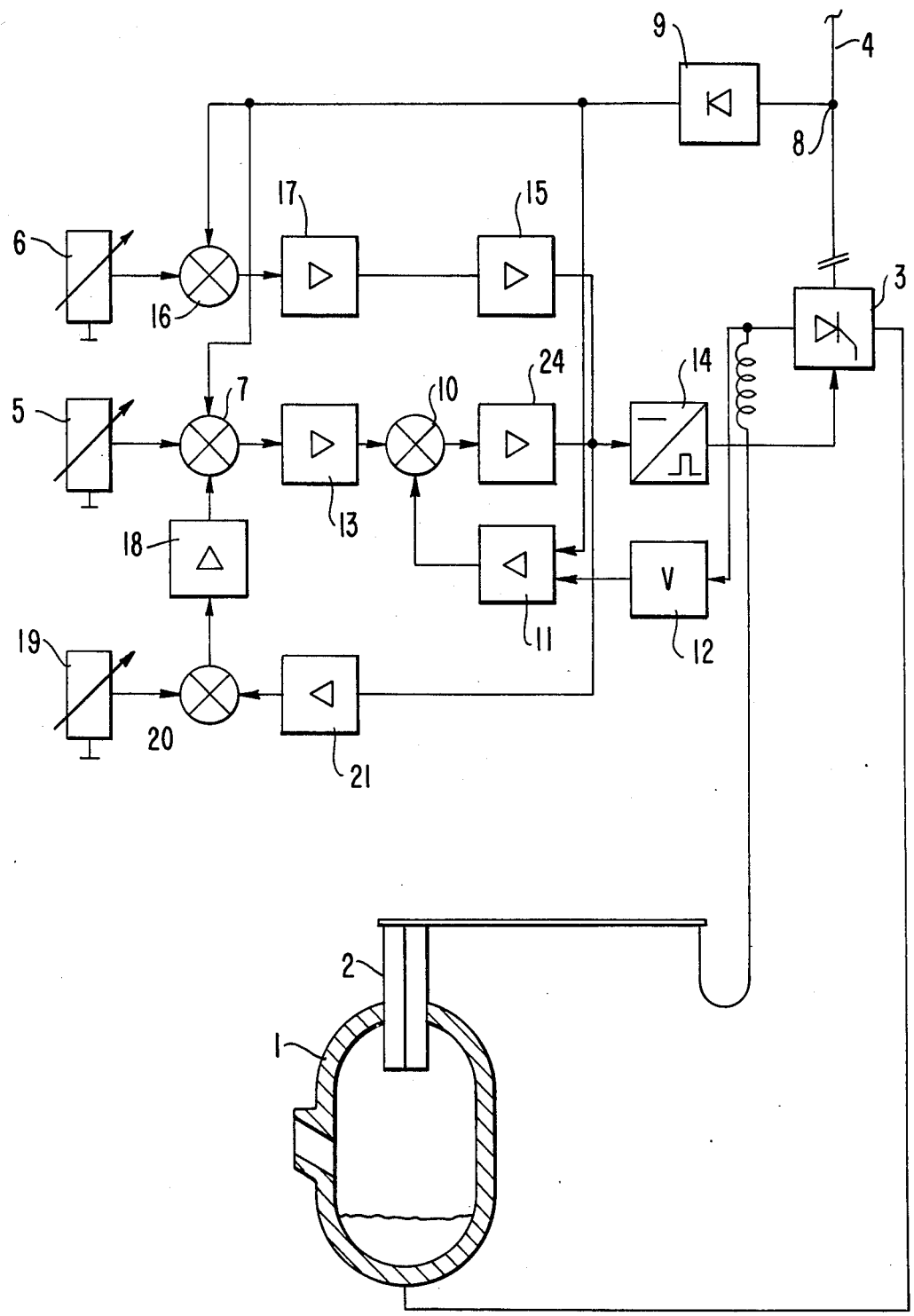

CONTROL APPARATUS FOR A DIRECT CURRENT ARC FURNACE

The present invention deals with an apparatus for control of an arc furnace powered by direct current and supplied from an alternating current electrical source by the intermediary of a controlled rectifier converter.

It is known that arc furnaces are the cause of perturbations in the electrical supply network, such as voltage fluctuations. These fluctuations entail bothersome variations in the luminosity of incandescent lamps (flicker effect). By powering the arc furnace with direct current, this effect is considerably reduced, because it is no longer necessary to reverse the arc, and thus to reignite it at each instant. Moreover, by acting upon the controlled rectifier converter, it is possible to regulate the arc current very rapidly. Such a mode of regulation is described, for example, in the French Pat. No. 2 462 079 (corresponding to U.S. Pat. No. 4,320,245), according to which an electric arc is regulated by means of a primary regulation of the power or impedance, and a secondary regulation of the current, by means of a reference value.

This mode of current regulation finds numerous applications in which the load to be powered is connected to an electronic converter, which is itself connected to the alternating current electric power network. However, it presents a drawback, for direct current arc furnaces, due to the very rapid arc voltage variations, which, even at constant current, are accompanied by very rapid variations in reactive energy. (It must be remembered that an alternating current power supply network presents a reactance which is much greater than its resistance.) For this reason, the fluctuation of reactive energy results in voltage variations which are very bothersome, since they arise at a frequency of less than 25 Hz.

It is also possible to act on the arc tension by varying the length of the arc, i.e. by moving the electrode, but this regulation is slow, because it is mechanical.

The present invention has as its object to obviate these drawbacks, and to minimize the perturbations introduced into the alternating current power supply network.

In summary, in the present invention, the regulation mechanism includes a loop for rapid regulation of the reactive energy drawn from the alternating current power supply network, and a circuit for limitation of the maximum intensity of the direct current circulating in the electrode. Preferably, for regulation of the reactive energy, the product of the intensity in the alternating current network and the sine of the dephasing angle is held essentially constant.

For this reason, in the short-circuit mode, wherein the cosine of the dephasing angle is very small, it is the current which is first reduced, which is favorable for the preservation of the electrodes, while a normal value will be given to the intensity at a time when the sine of the dephasing angle is relatively small.

The desired point of operation is reestablished, for example, by a slow loop for control of the current or active power, acting either on the reference of the reactive energy, or on the electrode separation. It is for this reason that, by preference, the regulating apparatus also includes a slow control loop limiting the variation of the reactive energy, and generating a reference signal of the reactive energy applied to the rapid control loop. It is also possible to add a control loop limiting the current drawn in transitory modes.

The invention will be better understood, and other goals, advantages and characteristics will be made more clear by the following description of one preferred embodiment, given as a non-limitational example, and to which one drawing is appended.

The single FIGURE represents schematically a control mechanism conforming to the present invention.

Referring to the FIGURE, at 1 is represented an arc furnace, provided with an electrode 2. The furnace is supplied with direct current by means of a converter 3 using controlled rectifiers, such as thyristors, connected to the alternating current electrical supply network 4.

A signal representing the reference current is established schematically at 5, and is applied to one input of a first comparator 7, to the other input of which is applied a signal representing the intensity of the current in the supply network 4.

In the FIGURE, by way of illustration, the intensity of the current is measured by aid of a current transformer 8, placed above the converter 3, i.e. on the network 4, at the output of which is arranged a circuit 9 generating the corresponding current intensity signal.

The output signal of this first comparator 7 is applied to a current regulator 13, having slow response, which accords the value of the current to that determined as reference, and develops a reference signal of reactive energy. This latter signal is applied to one input of a second comparator 10, to the other input of which is applied a signal representing the actual reactive energy. The last mentioned signal is developed by the circuit 11, at the inputs to which are applied respectively the signal representing the current, generated by the circuit 9, and the signal representing the arc voltage, generated by the circuit 12.

The output signal of this second comparator 10 is applied to the input of a rapid-response regulator 24, whose output signal enables control of a dephaser 14, generating impulses for control of the rectifiers of the converter 3, i.e. at the trigger of the thyristors of this converter 3. The response time of this regulator must be such that it can attenuate the perturbations of the frequencies most perceptible in the flicker effect.

In 6 is determined the maximum intensity of the current. The module for limitation of the intensity 15 receives a control signal only when the current exceeds a given threshold. To this end, schematically represented in the FIGURE is a third comparator 16, to the respective inputs to which are applied the signals representing the maximum current determined in 6, and the actual current determined at 9. The output of this comparator 16 is applied to a threshold circuit 17, which generates a control signal to be applied to the intensity limitation module 15 only when the current in the network 4 exceeds the value determined at 6. When it is activated, this module 15 imposes the signal controlling the dephaser 14, generating impulses for control of the converter 3.

The signal controlling the dephaser 14 is preferably constituted by a direct current voltage, so as to be able to be applied through the intermediary of an amplifier 21, to one input of a fourth comparator 20, to another input of which is also applied a maximum voltage determined at 19, and at the output of which is placed a limiter circuit 18, which generates a signal applied to the first comparator 7, to limit the increase in the control signal when the dephaser control voltage exceeds the value determined at 19, i.e. to reduce the current applied in the transitory mode.

In order to simplify the drawing and to show the invention more clearly, in the FIGURE there has been represented no mechanical or hydraulic mechanism enabling the electrode 2 to be raised or lowered in the furnace 1. Obviously, such mechanisms are well known to the man of art, and all electrodes include one. Also not represented, for the same purpose, are internal or peripheral control loops which can also be incorporated, such as the current linearization loop described in the French Pat. No. 1 375 853, or a peripheral active power loop.

Although only one embodiment of the invention has been described, it is obvious that many modifications may be incorporated by the man of art without departing from the framework of the present invention.

For example, it is possible to adapt this embodiment of the invention to a dodecophase assembly, essentially doubling the number of its components, and adding AND and OR gates and summing circuits. It is furthermore possible to make use of a control loop for the active power, acting directly on the electrode raising control, so as to determine the operating point of the system.

I claim:

1. Control apparatus for an arc furnace having at least one electrode powered with direct current from an alternating electric power source through a controlled-rectifier converter, comprising fast-response control loop means coupled to a control input means of said converter for adjusting the operation of said converter in response to the reactive energy drawn from said power source for stabilizing against rapid fluctuation in the reactive energy drawn from said power source, and a limiting circuit coupled to the control input means of said converter for limiting the current flow said converter passes to said electrode to a predetermined maximum intensity.

2. Control apparatus according to claim 1, wherein said fast-response control loop means operates to hold the product of current intensity in said power source and the sine of the dephasing angle substantially constant.

3. Control apparatus according to claim 1, including slow-response control loop means coupled to said fast-response control loop means for generating a reactive energy reference signal and applying that signal to said fast-response control loop means to limit variation of the reactive energy drawn from said power source.

4. Control apparatus according to claim 1, including additional control loop means coupled to said control input means of said converter for limiting the current drawn by said electrode in a transitory mode.

5. Control apparatus according to claim 1, wherein said fast-response control loop means is coupled to said control input means of said converter through a dephaser having an output connected to said control input means.

6. Control apparatus according to claim 5, wherein said fast-response control loop means provides a control voltage to a control input of said dephaser to adjust the operation of said dephaser and thereby to adjust the operation of said converter.

7. Control apparatus according to claim 6, wherein an output of said limiting circuit is connected to said control input of said dephaser and wherein said limiting circuit limits current flow to said electrode by modifying said control voltage.

8. Control apparatus according to claim 7, including additional control loop means connected between said control input of said dephaser and said fast-response control loop means for limiting current flow to said electrode in a transitory mode by limiting said control voltage applied to said dephaser to a predetermined maximum level.

9. Control apparatus according to claim 1, including means connected to an input of said fast-response control loop means for generating a reactive energy reference signal as a function of a reference signal for current intensity in said power source and a signal representing the actual current intensity in said power source.

10. Control apparatus according to claim 1, including additional control loop means connected for adjusting a control for raising said electrode in response to the active power drawn from said power source.

* * * * *